US011019576B2

(12) United States Patent
Ameixieira

(10) Patent No.: US 11,019,576 B2
(45) Date of Patent: *May 25, 2021

(54) SYSTEMS AND METHODS FOR DYNAMIC MANAGEMENT OF TRANSMIT POWER IN A NETWORK OF MOVING THINGS

(71) Applicant: Veniam, Inc., Mountain View, CA (US)

(72) Inventor: Carlos Eduardo Braga Ameixieira, Oporto (PT)

(73) Assignee: VENIAM, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,276

(22) Filed: Jul. 1, 2019

(65) Prior Publication Data

US 2019/0327690 A1 Oct. 24, 2019

Related U.S. Application Data

(63) Continuation of application No. 15/657,612, filed on Jul. 24, 2017, now Pat. No. 10,341,963, which is a
(Continued)

(51) Int. Cl.
*H04W 52/28* (2009.01)
*H04W 52/22* (2009.01)
(Continued)

(52) U.S. Cl.
CPC ............ *H04W 52/28* (2013.01); *H04W 4/44* (2018.02); *H04W 52/226* (2013.01);
(Continued)

(58) Field of Classification Search
CPC ... H04W 52/28; H04W 72/0473; H04W 4/44; H04W 52/46; H04W 52/281;
(Continued)

(56) References Cited

U.S. PATENT DOCUMENTS 7,430,433 B2 * 9/2008 Choi .................. H04W 52/267
455/522
7,808,952 B2 * 10/2010 Duan .................... H04L 1/0002
370/335

(Continued)

OTHER PUBLICATIONS

Int'l Search Report and Written Opinion for Appln. No. PCT/US2017/023578 dated May 25, 2017 (14 pages).

*Primary Examiner* — Man U Phan
(74) *Attorney, Agent, or Firm* — McAndrews, Held & Malloy, Ltd.

(57) ABSTRACT

Methods and systems are provided for dynamic management of transmit power in a network of moving things. In a first node of a wireless network that includes a plurality of nodes, receiving a packet for transmission to a second node of the plurality of nodes, determining a RF transmit power level for use in transmitting the packet, and wirelessly transmitting the received packet to the second node using the RF transmit power level. The RF transmit power level may be determined is based on one or both of: at least one adjustable RF transmit power level corresponding to the second node that is maintained at the first node; and RF transmit power level information obtained from one or more other nodes of the plurality of nodes.

19 Claims, 14 Drawing Sheets

Related U.S. Application Data continuation of application No. 15/420,215, filed on Jan. 31, 2017, now Pat. No. 9,736,791.

(60) Provisional application No. 62/312,495, filed on Mar. 24, 2016.

(51) Int. Cl.
  *H04W 52/46* (2009.01)
  *H04W 4/44* (2018.01)
  *H04W 72/04* (2009.01)

(52) U.S. Cl.
  CPC ....... *H04W 52/281* (2013.01); *H04W 52/283* (2013.01); *H04W 52/46* (2013.01); *H04W 72/0473* (2013.01)

(58) Field of Classification Search
  CPC . H04W 52/283; H04W 52/226; H04W 72/04; H04W 29/08
  USPC ......................................................... 370/328
  See application file for complete search history.

(56) References Cited

U.S. PATENT DOCUMENTS

| | | | |
|---|---|---|---|
| 7,860,179 B2* | 12/2010 | Bar-Ness | H04L 27/2608 375/260 |
| 7,945,214 B2 | 5/2011 | Kim et al. | |
| 8,031,602 B2 | 10/2011 | Jiang | |
| 8,107,989 B2* | 1/2012 | Budampati | H04W 52/08 455/522 |
| 8,351,417 B2 | 1/2013 | Chen et al. | |
| 8,437,255 B2 | 5/2013 | Jiang | |
| 8,923,910 B2* | 12/2014 | Wu | H04W 52/343 455/522 |
| 9,088,859 B2 | 7/2015 | Egner et al. | |
| 9,161,297 B2 | 10/2015 | Lee et al. | |
| 9,167,591 B2 | 10/2015 | Egner et al. | |
| 9,265,012 B2* | 2/2016 | Garg | H04W 52/267 |
| 9,681,393 B2* | 6/2017 | Mohlmann | H04B 7/15535 |
| 9,936,464 B2* | 4/2018 | D'Angelo | H04W 52/34 |
| 9,992,701 B2* | 6/2018 | Egner | H04W 28/0221 |
| 2003/0016702 A1 | 1/2003 | Bender et al. | |
| 2004/0242258 A1 | 12/2004 | Kim | |
| 2005/0096078 A1 | 5/2005 | Choi et al. | |
| 2006/0215593 A1 | 9/2006 | Wang et al. | |
| 2008/0316052 A1 | 12/2008 | Ruffini | |
| 2011/0085497 A1 | 4/2011 | Fang et al. | |
| 2011/0289578 A1 | 11/2011 | Bugenhagen et al. | |
| 2012/0176998 A1* | 7/2012 | Muellner | H04W 52/146 370/329 |
| 2013/0128786 A1 | 5/2013 | Sultan et al. | |
| 2015/0156254 A1 | 6/2015 | Skaaksrud | |
| 2016/0182388 A1 | 6/2016 | Tsuruoka | |
| 2016/0234790 A1 | 8/2016 | D'Angelo et al. | |

\* cited by examiner

SYSTEMS AND METHODS FOR DYNAMIC MANAGEMENT OF TRANSMIT POWER IN A NETWORK OF MOVING THINGS

CROSS-REFERENCE TO RELATED APPLICATIONS/INCORPORATION BY REFERENCE

This patent application is a continuation of U.S. patent application Ser. No. 15/657,612, filed on Jul. 24, 2017, now issued U.S. Pat. No. 10,341,963, which is a continuation of U.S. patent application Ser. No. 15/420,215, filed on Jan. 31, 2017, now issued U.S. Pat. No. 9,736,791, which makes reference to, claims priority to, and claims benefit from U.S. Provisional Patent Application Ser. No. 62/312,495, filed on Mar. 24, 2016, and titled "Systems and Methods for Transmission Power Adaptation in the Network of Moving Things." Each of the above identified applications is hereby incorporated herein by reference in its entirety.

This patent application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
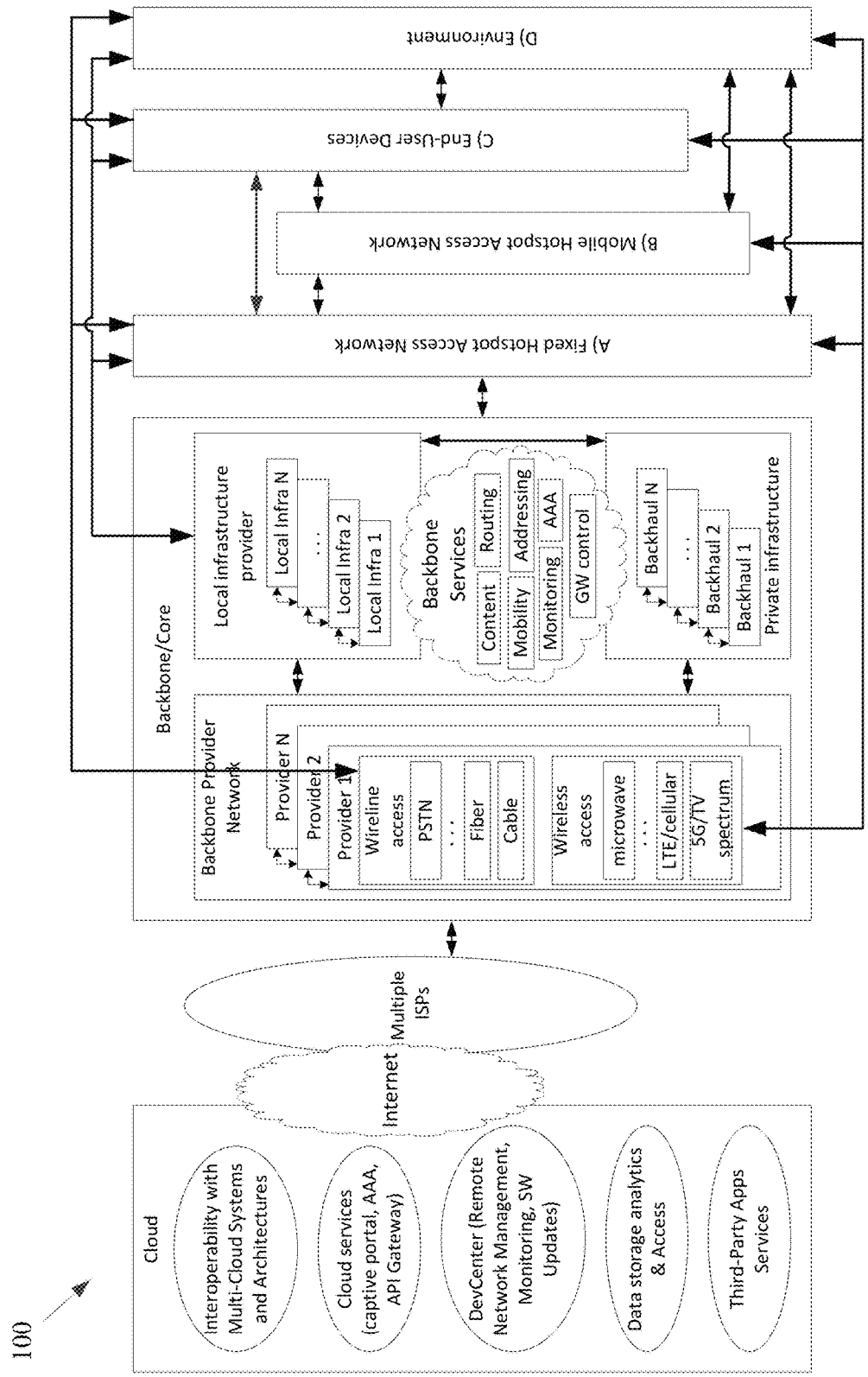
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may support transmission power adaptation in a network of moving things comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed on Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
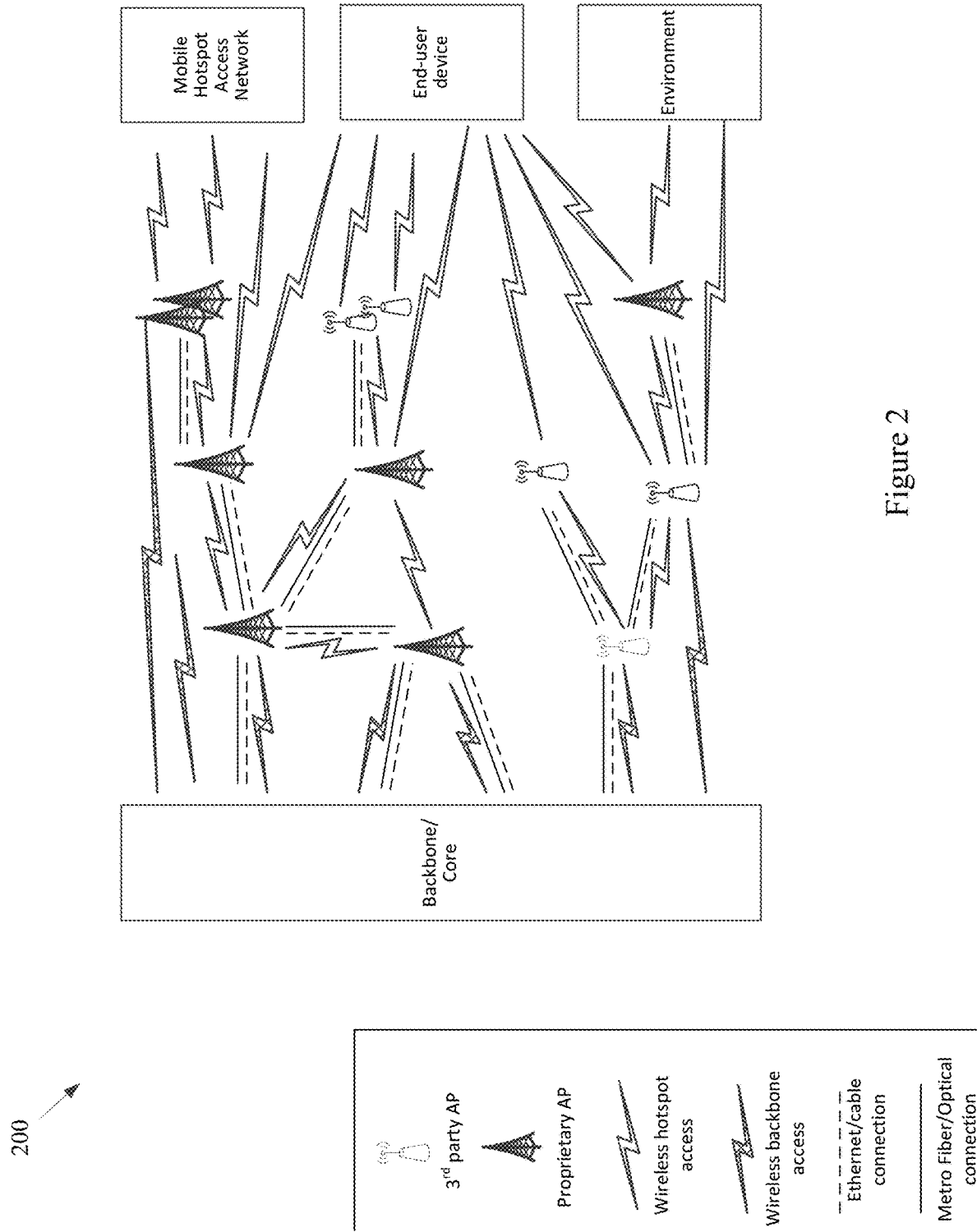
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
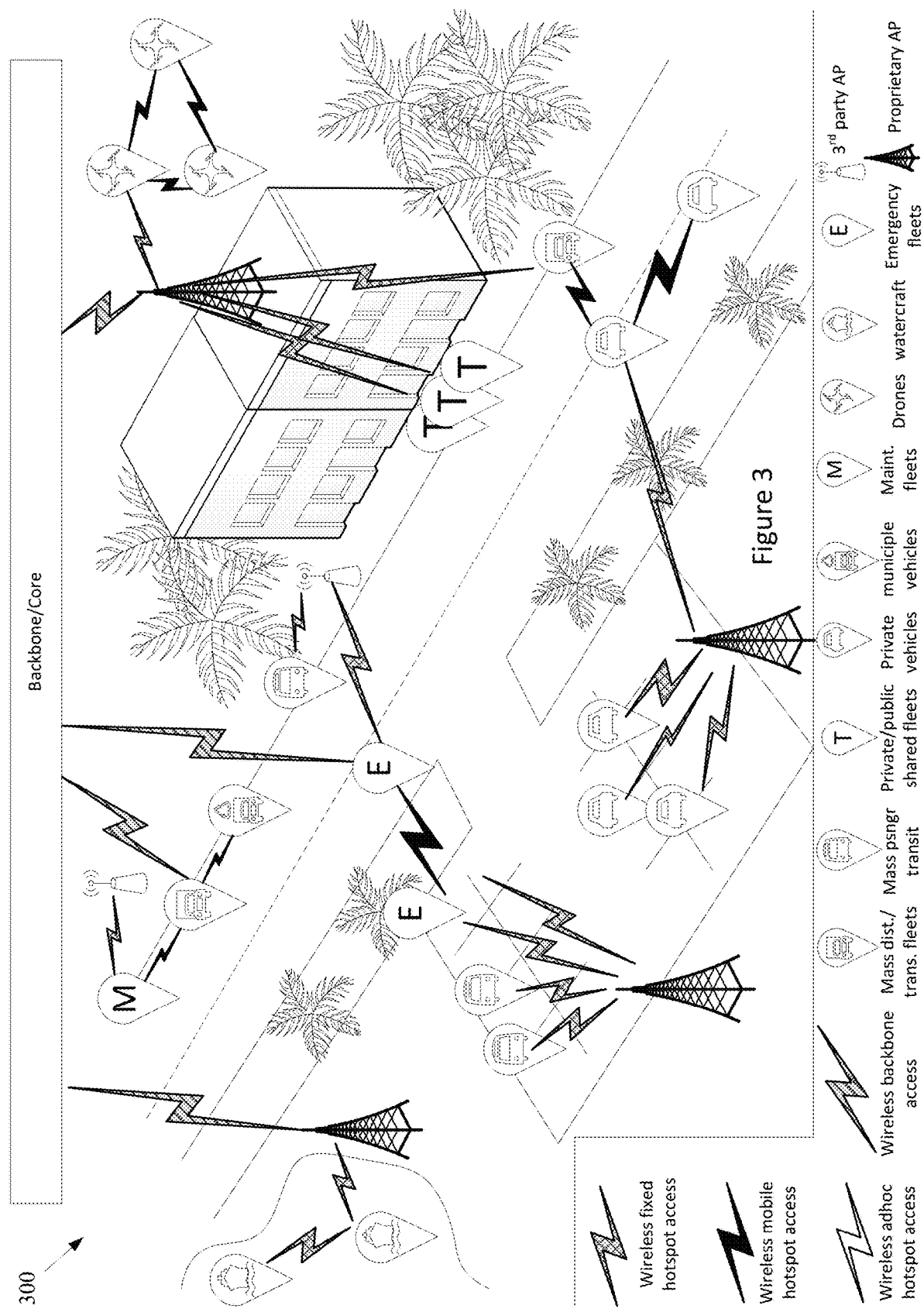
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
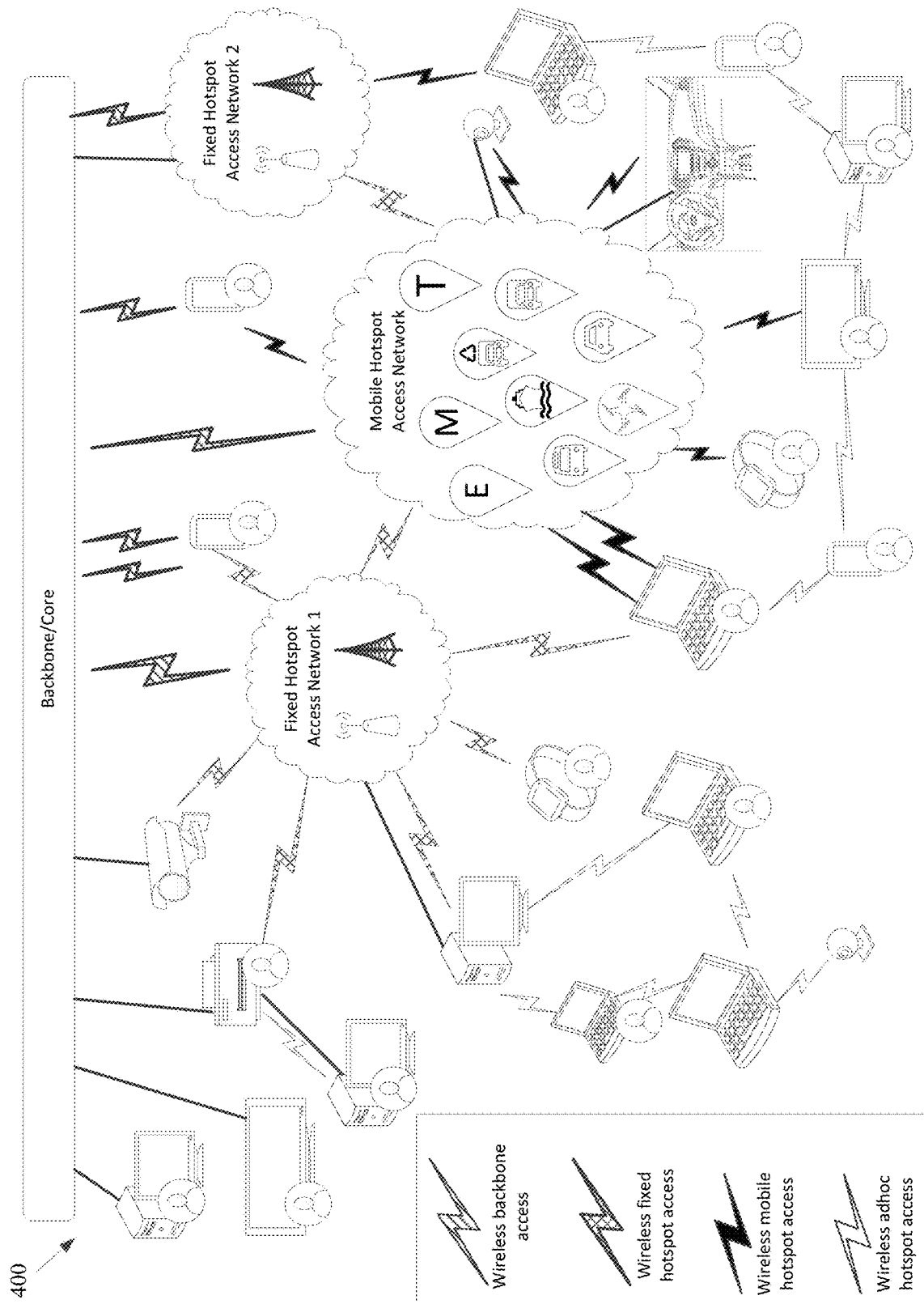
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
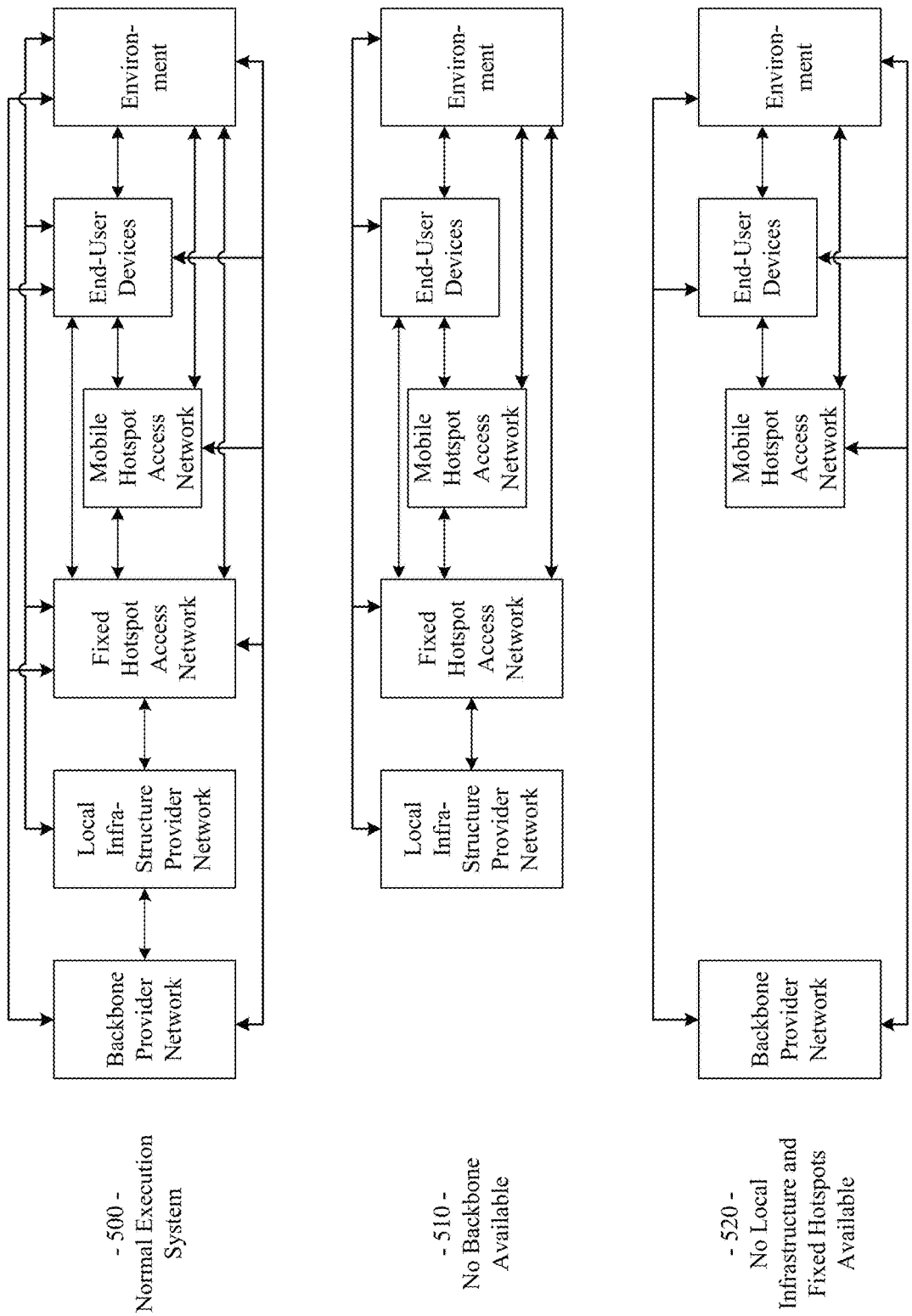
FIGS. 5A-5C show a plurality of network configurations illustrating the flexibility and/or and resiliency of a communication network, in accordance with various aspects of this disclosure.
Figure 5B:
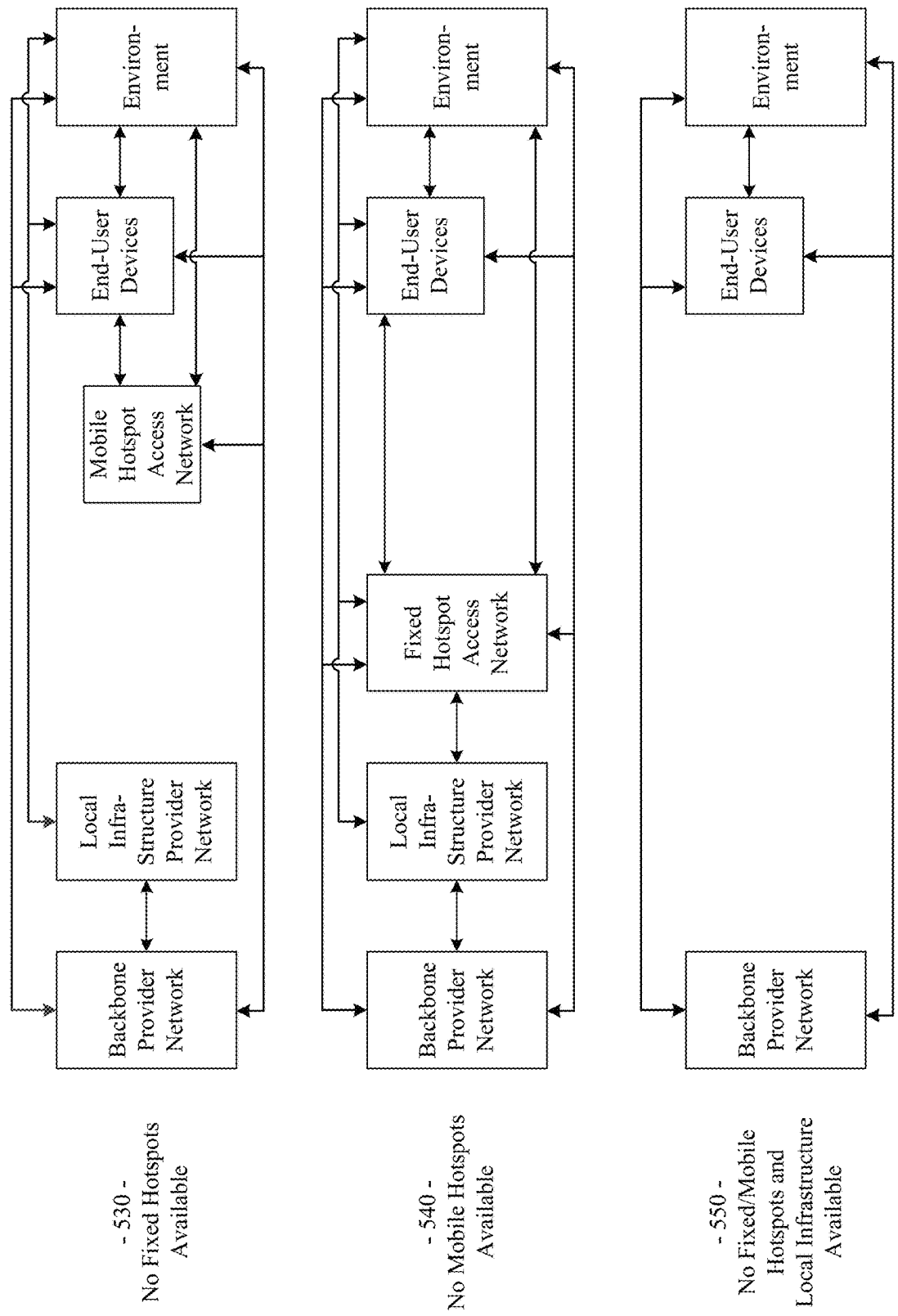
Figure 5C:
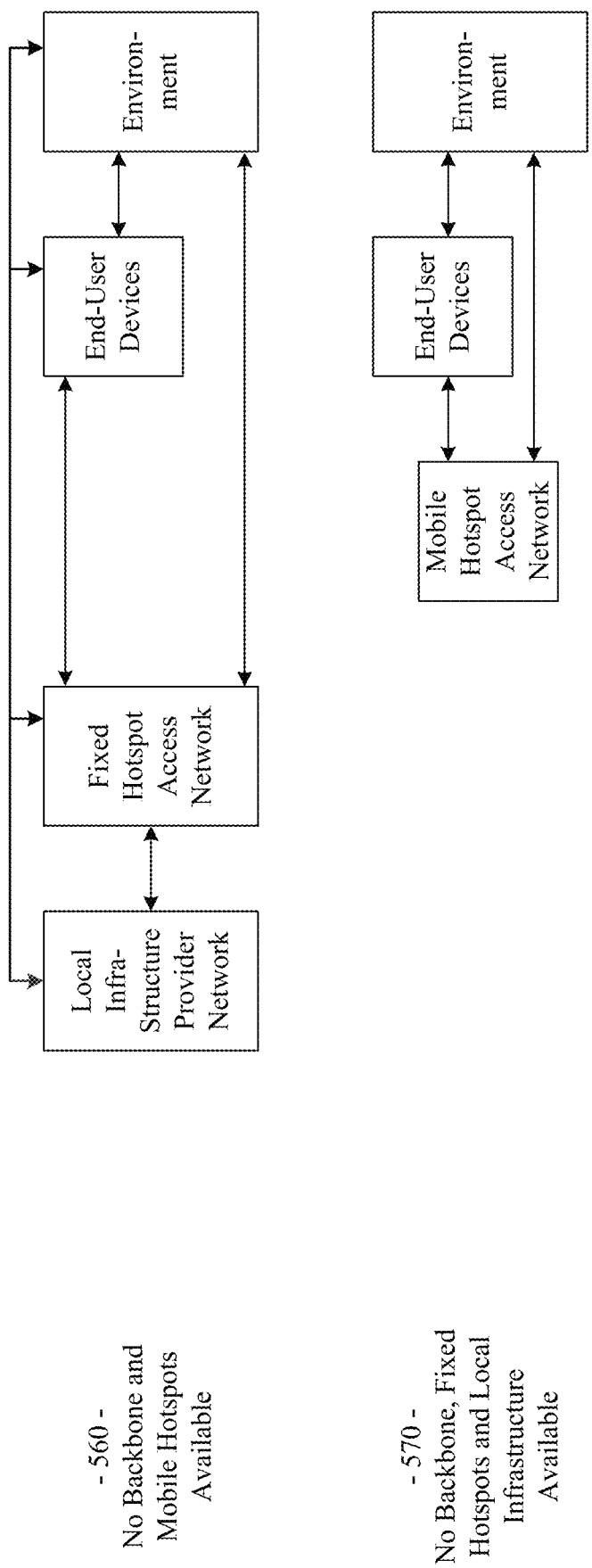

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
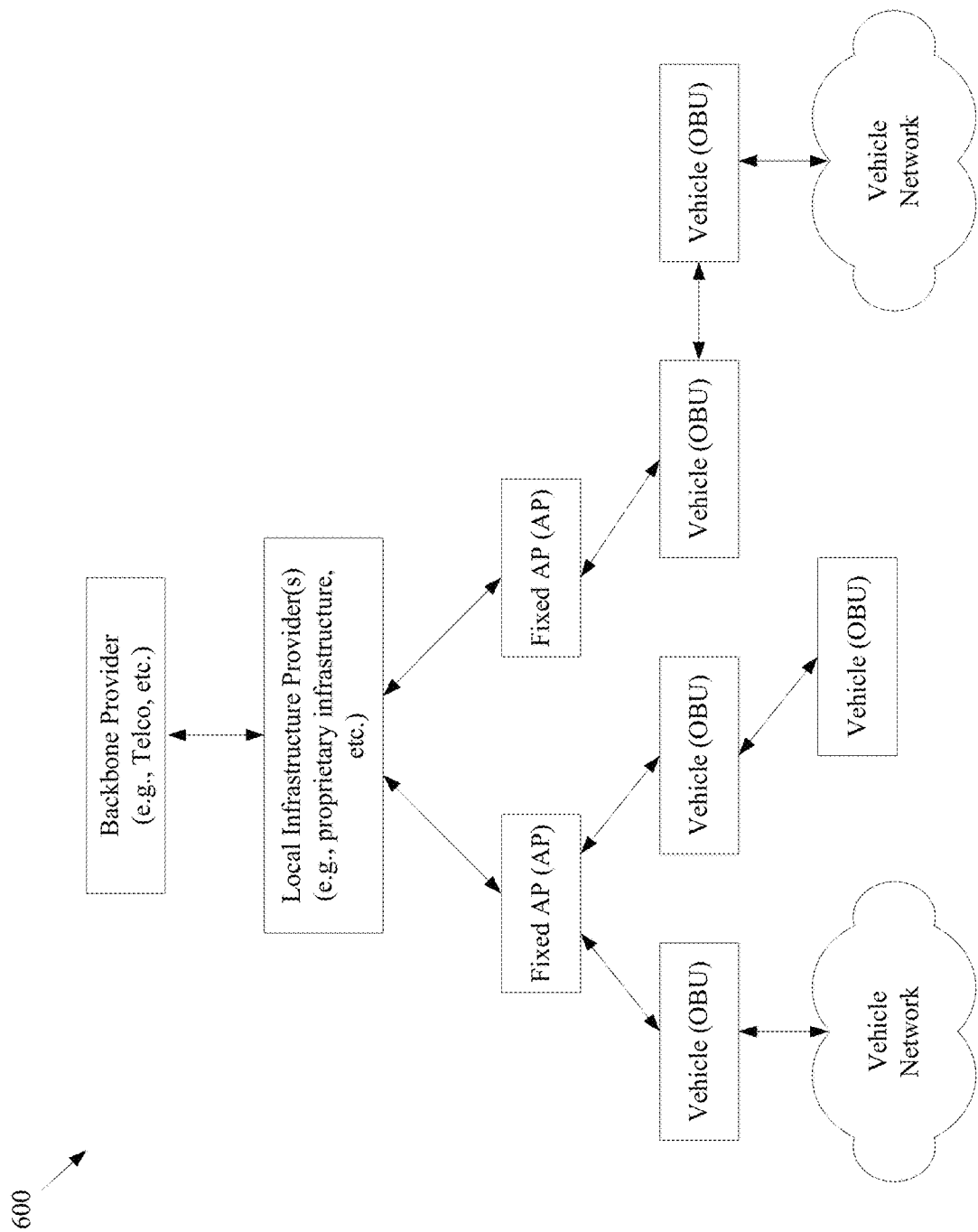
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Mobility of communication systems introduces a variety of engineering challenges, one of which is control/management of power consumption of network elements. One reason for this is that portable devices are typically resource-constrained in terms of, for example, the capacity of the source of power (e.g., battery life). Adaptive radio frequency (RF) transmission power control methods and systems described herein can help to greatly reduce the power consumption of any individual network device and/or aggregate power consumption of a mesh network of such devices. In addition to energy savings, reducing RF transmission power to a minimum necessary power for achieving suitable wireless communication (e.g., reception) performance can reduce the range of RF signals used for communication, and thereby reduce interference (e.g., collisions of transmissions). A number of factors may be used in determining the optimal RF transmission power to use for any given context in a network of moving things including, by way of example and not limitation, the density of vehicles with network nodes in a particular geographic region, the distance between wireless network nodes, the modulation and/or encoding schemes in use by the wireless network nodes, the maximum allowable information (e.g., packet) latency to/from the wireless network nodes, and the minimum acceptable network throughput.

The density of vehicles in a region may influence power consumption by wireless network nodes because as the number of network nodes (e.g., in vehicles such as automobiles, trucks, buses, and autonomous (i.e., driverless) vehicles) increases, the occurrence of network nodes transmitting at the same time within a particular geographic area or region may increase, which may influence the number of packet collisions that occur, thus affecting channel throughput, and the number of transmissions needed for successful data transfer.

The distance between wireless network nodes is another factor that affects the RF transmission power level needed to send information (e.g., a packet) between the network node transmitting the information and the intended target network node intended to receive the information, and thus affects the power consumption of the network node.

The modulation and/or encoding scheme in use may affect power consumption of wireless network nodes in that, for example, the use of higher-order modulation schemes and/or lower forward error correction code rates may require higher RF transmit power for a given transmission range.

The maximum allowable information (e.g., packet) latency may affect the power consumed by wireless network nodes because sufficient RF transmit power is needed to, for example, avoid the need for retransmission of information (e.g., packet retransmission), which would increase latency of information transmitted through the network. Information latency requirements may be determined, for example, by the application in use and/or the type of data traffic being communicated. For example, vehicle telemetry information having safety implications may require lowest latency, while a higher but still relatively low latency may be desirable for good user experience for voice-over-Internet Protocol (VoIP) traffic, and a still higher latency may be tolerable for file downloads (e.g., files or a webpage).

The required throughput of a network of moving things may affect network node power consumption because the RF transmit power level affects throughput by, for example, impacting signal-to-noise ratio and collisions with transmissions of other network nodes. Similar to latency, the throughput required by a client using the network may be determined by the application and/or type of data traffic being communicated.

Accordingly, this disclosure describes methods and systems for what is referred to herein as context-aware transmission power adaptation (CATPA), which may take into account factors such as those discussed above to provide power-efficiency, bandwidth-efficiency (e.g., congestion/collision avoidance), adaptation based on the mobility of the source and/or target nodes, and adaptation based on the communication context (e.g., the presence of stacks of containers in a shipping yard, high-density of vehicles or fixed access points (FAPs), and/or a myriad of other parameters which may be part of the context). The example CATPA methods and systems described herein provide for fast adaptation and communication channel improvement using local network node information and information shared throughout the network. The example approaches described herein enable, for example, fast determination of the optimal transmission power to use for any particular communication based on the context of the communication (e.g., the physical environment and/or goals such as quality of service (QoS) and power efficiency). The CATPA methods and systems described herein may automatically adapt/learn based on inputs from mobile access points (mobile APs), the Cloud, fixed APs, environmental sensors, and/or various end-user devices. These inputs may be broadcast by the devices of the network and/or obtained through probing of the device of the network. The CATPA methods and systems described herein may combine and consider these inputs in a variety of ways in order to determine the level of RF transmit power to use for any particular communication by any particular network element (e.g., network node such as mobile AP, fixed AP, network controller (NC), and/or sensor(s)). Such determinations may be made in real-time, thereby enabling the CATPA methods and systems to assess the impact of a change in RF transmit power before actually making the change (i.e., a "make-before-break" approach). The CATPA methods and systems may, for example, determine RF transmission power to use for a particular transmission based on historical data (e.g., advertised by the Cloud, by fixed APs, by mobile APs, by end-user devices, and/or by sensors). Such historical data may, for example, have been gathered in a context similar to the current context (e.g., previously gathered in a location having the same or similar physical environment (e.g., buildings or other obstructions), the same or similar density and/or relative locations of end-user or other devices, the same or similar density and/or relative locations/distances of mobile APs, the same or similar density and/or relative locations/distances of fixed APs, the same or similar atmospheric conditions, etc.). The CATPA methods and systems may involve relatively infrequent changing of RF transmission power of network nodes, thus reducing oscillations between different RF transmit power levels and reducing computational resources used in carrying out such changes in RF transmit power.

Figure 7:
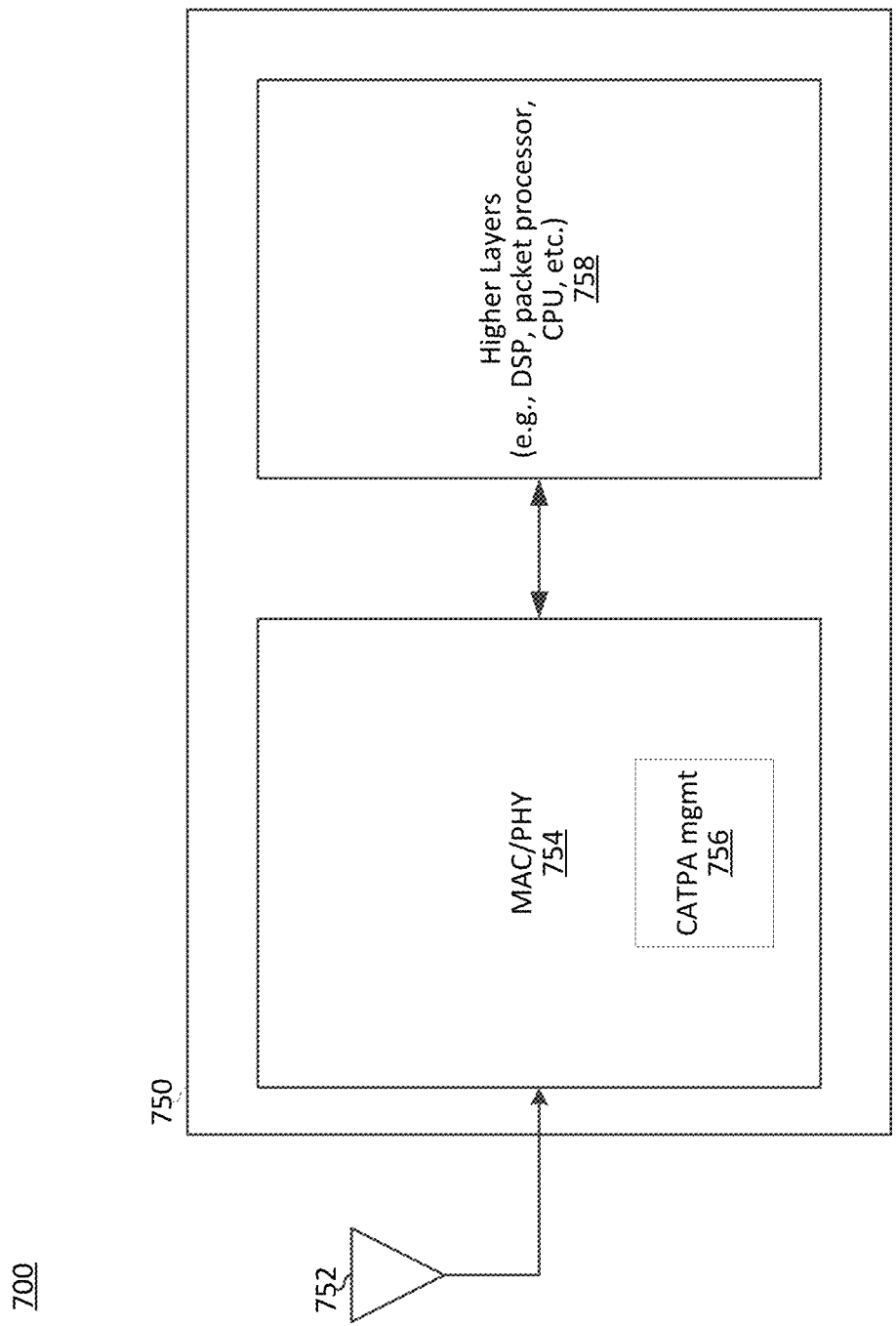
FIG. 7 depicts a block diagram of functional elements of an example network node of a network of moving things, in accordance with various aspects of the present disclosure.

FIG. 7 depicts a block diagram of functional elements of an example network node 750 of a network of moving things, in accordance with various aspects of the present disclosure. The network node 750 may be, for example, a mobile AP, a fixed AP, a sensor, or an end-user device. The network node 750 of FIG. 7 comprises an antenna 752, media access control (MAC)/physical (PHY) protocol layer functionality 754, and higher protocol layer functionality 758. The MAC/PHY protocol layer functionality 754 and higher protocol layer functionality 758 may, for example, comprise any suitable combination of firmware, software, circuitry, and/or logic (e.g., discrete, field-programmable gate array (FPGA), application specific integrated circuit (ASIC), microprocessor/microcomputer, reduced-instruction-set (RIS) processor, multi-core processor, ARM-based processor etc.).

The MAC/PHY protocol layer functionality 754 may be operable to report to the higher protocol layer functionality 758, a number of parameters and/or measurements including, for example, an indication of the received RF power for each transmission (e.g., packet) successfully received (e.g., a receive signal strength indicator (RSSI) value). Such an indication may be included in a report that may be referred to herein as a "hardware received packet status report." The MAC/PHY protocol layer functionality 754 may also be operable to include in a report to the higher protocol layer functionality 758, for example on a periodic and/or on an event-driven basis, a "channel load parameter" useful for determining congestion in the network. Information describing a suitable channel load parameter may be found, for example, in Section 6.4 "DCC access control loop" of European Telecommunications Standards Institute (ETSI) Technical Specification TS 102 687 V1.1.1 (2011-07), which is hereby incorporated herein by reference, in its entirety. In addition, the MAC/PHY protocol layer functionality 754 may be operable to include in a report to the higher protocol layer functionality 758, the transmission status (e.g., transmission is pending, transmission was successful, transmission failed) of each packet to be transmitted into the network. Such transmission status information may, for example, be included in a report that may be referred to herein as a "hardware transmit packet status report."

The MAC/PHY protocol layer functionality 754 and the higher protocol layer functionality 758 of FIG. 7 may, for example, implement a rate control adaptation algorithm such as that described in, for example, U.S. Provisional Patent Application Ser. No. 62/250,544 filed on Nov. 4, 2016, which is hereby incorporated herein by reference, in its entirety. The MAC/PHY protocol layer functionality 754 and the higher protocol layer functionality 758 may be operable to interoperate to send (e.g., periodically and/or on an event-driven basis), into the network for receipt by neighbor nodes, the Cloud, and/or other nodes, messages containing various information about the network node 750 (e.g., its Global Navigation Satellite System (GNSS)/Global Positioning System (GPS) coordinates, its current RF transmit power settings, current contents of various data structures, etc.).

The functionality operable to perform various aspects of the present disclosure may be referred to herein as a CATPA Management Entity (CME), shown in the example of FIG. 7 as CME 756. In the example shown in FIG. 7, the CME 756 is shown as a part of the MAC/PHY protocol layer functionality 754. In another example implementation, however, the CME 756 may, for example, be implemented in a processor (e.g., an ARM-based processor) of a network adaptor, where the processor also implements the MAC functions (and possibly higher layer functions) of the network node 750, shown in FIG. 7 as the MAC/PHY protocol layer functionality 754 and the higher protocol layer functionality 758. The CME 756 may, for example, operate at a relatively low layer (e.g., at the data link layer) in the network protocol stack of the network node 750, so as to minimize protocol overhead and enable fast reactions to changes in RF communication channel conditions. The CME 756 may, for example, maintain one or more data structures pertaining to potential communication partners ("targets"). The CME 756 may maintain a data structure (e.g., a table, list, etc.) containing modulation, distance, and/or transmission power information, which may store determined optimal RF transmission power for particular communication distances and particular modulation and encoding schemes. For example, the data structure may contain entries for an optimal RF transmit power for a distance D1 and a modulation/encoding scheme ME1, an optimal RF transmit power for a distance D2 and a modulation/encoding scheme ME2, an optimal RF transmit power for a distance D1 and the modulation/encoding scheme ME2, and so on. The CME 756 may, for example, be operable to use a propagation model (e.g., in the form of one or more mathematical functions and/or lookup tables) for calculating/predicting the effects of various RF transmission powers.

Figure 8:
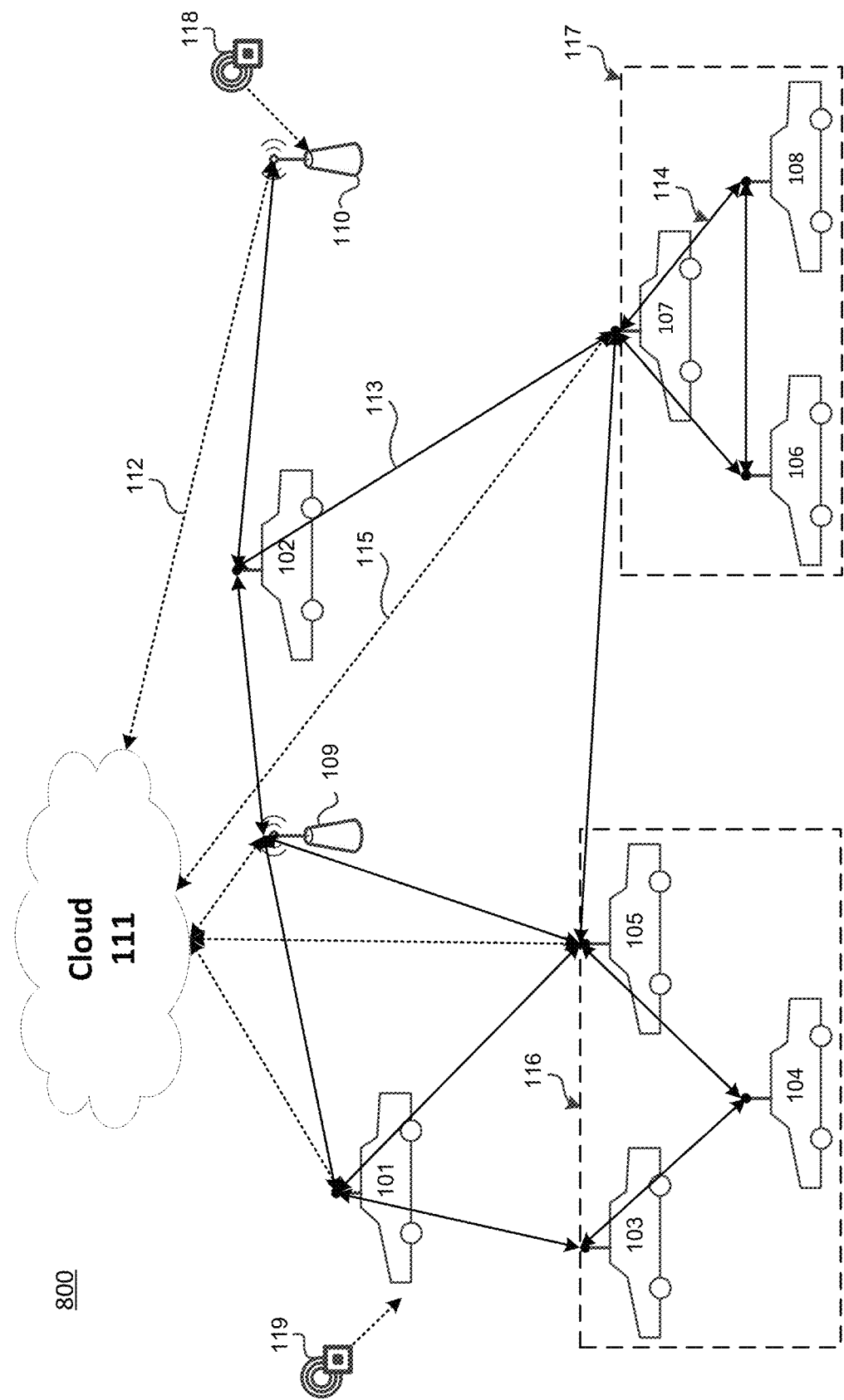
FIG. 8 shows depicts an example network of moving things in which different network nodes within the network may share information, both remotely and locally, in accordance with various aspects of the present disclosure.

FIG. 8 shows depicts an example network of moving things 800 in which different network nodes 101-110 within the network may share information, both remotely and locally, in accordance with various aspects of the present disclosure. Network nodes 103, 104, and 105 are shown as being within a determined distance of one another and/or as sharing a context and thus form what CATPA treats as a cluster 116, while network nodes 106, 107, and 108 form another cluster 117. Network nodes 109 and 110 are shown as fixed APs, which may be connected to, for example, the Internet (or other WAN) and thus to the Cloud 111. Dotted lines 112, 115, 120, 121, and 122 represent direct communication to the Cloud. Solid lines represent direct communication between nodes of the vehicular mesh network. Sensors 118 and 119 are shown as being locally connected (e.g., either directly or through a wired or wireless local area network (LAN)) to fixed AP 110 and mobile AP 101, respectively. The sensors 118 and 119 (e.g., cameras, motion sensors, weather sensors, environmental sensors, GNSS/GPS receivers, vehicle systems (e.g., navigation, autonomous control), etc.) provide important information about the current location, which can be used to better determine environmental conditions.

Figure 9:
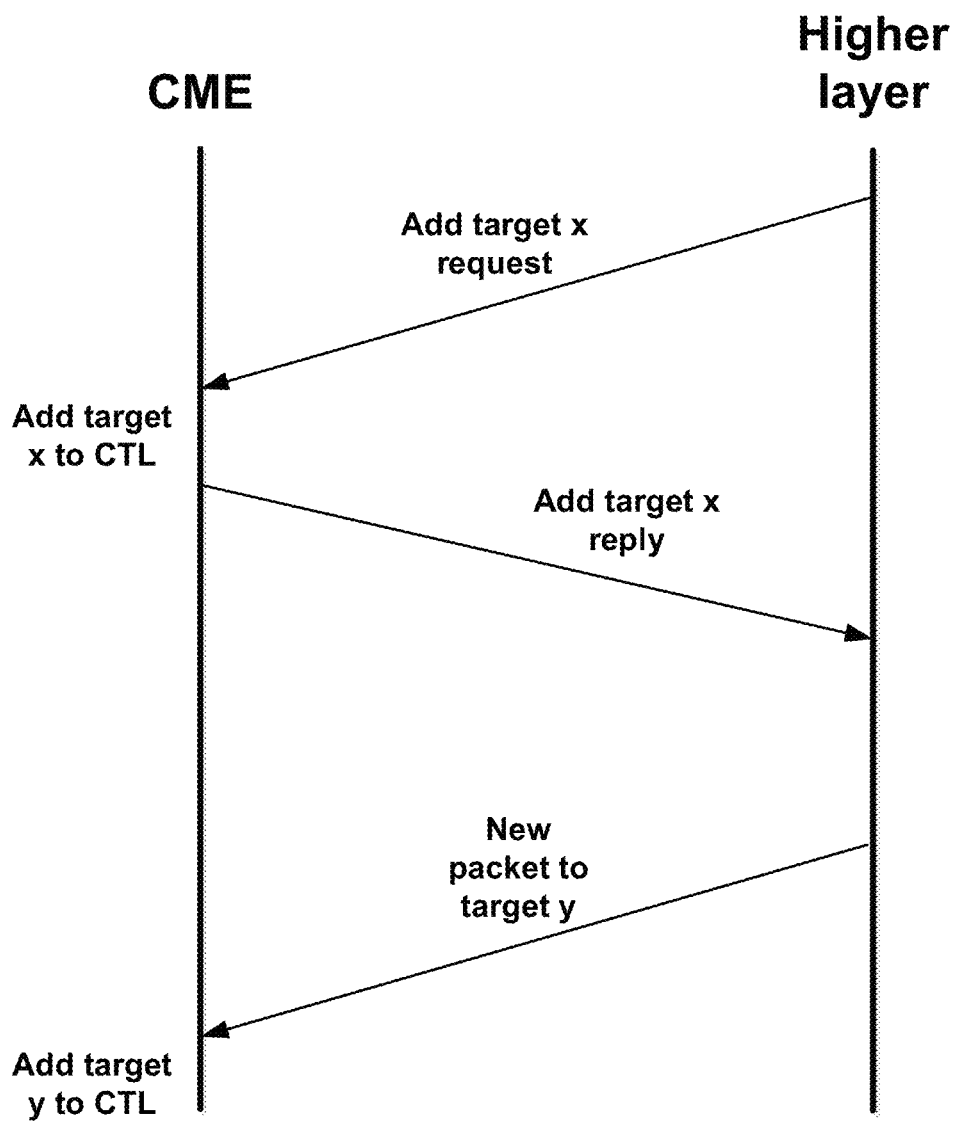
FIG. 9 is an example message exchange diagram in which a network node "target x" is illustrated as being explicitly added to the CTL of the present disclosure by a request to add "target x," while a network node "target y" is shown as being implicitly added to the CTL, by sending a packet to "target y," in accordance with various aspects of the present disclosure

The CME (e.g., CME 756 of FIG. 7) of any particular network node in the network may, for example, control "probing" of the RF communication channel in order to determine, in real-time, the best RF transmission power to be used for communication between a network node acting as an originating/source network node and a destination/target network node. The CME (e.g., CME 756) may maintain a data structure identifying possible target network nodes, which may be referred to herein as a "CME target list" (CTL). A target network node may be added to the CTL either implicitly or explicitly. Adding a target network node to the CTL implicitly may occur, for example, when outgoing packets from a higher layer are inspected (e.g., inspecting Internet protocol (IP) packets from the network layer for destination MAC addresses not already in the CTL), and the destination network nodes identified in such packets are automatically added to the CTL. Adding a target network node to the CTL explicitly may occur when the CME (e.g., CME 756 of FIG. 7) receives an instruction from a higher protocol layer to add one or more target network nodes to the CTL data structure (e.g., with or without an accompanying outgoing packet that is destined for the target node(s)). With specific reference to the example message exchange of FIG. 9, "target x" is illustrated as being explicitly added to the CTL by a request to add "target x," while "target y" is shown as being implicitly added to the CTL, by simply sending a packet to "target y."

A CME (e.g., CME 756 of FIG. 7) in accordance with various aspects of the present disclosure may present various status indications to higher protocol layers (e.g., higher protocol layer functionality 758 of FIG. 7) including, by way of example and not limitation, an indication representative of an "Idle" condition in which no target network nodes are present (i.e., the CTL is empty), an indication representative of an "Active" condition in which the CME (e.g., CME 756 of FIG. 7) has existing target nodes, and an indication representative of a "Stopping" condition in which the CME is transitioning to the "Idle" condition. In the "Stopping" condition, the CME may, for example, ignore all requests for the "hardware transmit status reports," discussed above.

A CME in accordance with various aspects of the present disclosure (e.g., the CME 756 of FIG. 7) may, for example, maintain/track various parameters for each target network node identified in its CTL including, for example, a status indication. A status indication for any particular target network node at any particular time may indicate a network node status as, for example, "Initializing/Updating," "Probing," or "Waiting." A target network node status indication of "Initializing/Updating" may, for example, represent that the particular target has been recently added to the CTL and/or the context of the CME has changed (e.g., the CME (e.g., CME 756) has moved to a new physical location, and thus the CME (e.g., CME 756) is in the process of determining/updating values of one or more parameters to be used for communications with the target network node. Such parameters may include, by way of example and not limitation, durations of timeouts to be used for probing the target network node, a number of probe packets to be used for evaluating the target network node, an initial RF transmit power to use for probing the target network node, an initial modulation/encoding scheme to use for probing the target network node, and/or the like.

A target network node status indication of "Probing" may, for example, represent that the CME (e.g., CME 756) is currently in a "Probing" phase in which the CME is assessing whether the current parameters values for the particular target network node are optimal/best/suitable/etc. for the current RF communication channel conditions. While the status indication for a particular target network node is set to "Probing," the CME may, for example, be performing the processes illustrated in and discussed below with regard to FIG. 10, FIG. 11, and FIG. 12, for that particular target network node.

A target network node status indication of "Waiting" may, for example, represent that the "Probing" phase for the target network node has ended. The CME (e.g., CME 756) may then wait or "sleep" until a new "Probing" phase is initiated, which may occur periodically or in response to a change in context of the CME, for example. In accordance with various aspects of the present disclosure, a CME may initiate a new "Probing" phase under a number of different conditions. For example, the CME may initiate a new "Probing" phase when the CME is active, is coming out of an "Initiating" target status, and a new packet for the target network node has been received from a higher protocol layer. The CME may also initiate a new "Probing" phase when the CME is active and needs to update parameters at the target network node, interrupting a "Waiting" status of the target network node. In that situation, the "Probing" phase may be initiated after a new packet for the updated target network node has been received by the CME from a higher protocol layer. The "Probing" phase may also be initiated when the CME is active, a "Waiting" period of the target network node has ended, and a new packet has been received for a specific registered target.

A CME in accordance with various aspects of the present disclosure (e.g., CME 756) may, after adding a target network node to its CTL, begin selecting from the packets to be transmitted by the network node of the CME, a certain maximum number of packets (NP) to act as "probes." In order to be able to evaluate the condition of the RF communication channel, the CME (e.g., CME 756) may maintain a data structure (e.g., a table, list, etc.) that may be referred to herein as a "CME transmit power table (CTPT)." In accordance with various aspects of the present disclosure, an example CPTP may store a number of parameters for each target network node in the CTL. Such parameters may include, by way of example and not limitation, a "current RF transmit power level," a "lower RF transmit power level," and a "higher RF transmit power level." The "current RF transmit power level" may, for example, represent the RF transmit power level currently being used for normal communication with the associated target network node; the "lower RF transmit power level" may, for example, represent the RF transmit power level immediately below the "current RF transmit power level," and the "higher RF transmit power level higher" may represent the RF transmit power level immediately above the "current RF transmit power level." Although three RF transmit power levels are used in the present example, a greater or lesser number may be used without departing from the scope of the present disclosure, as a different number of RF transmit power levels may be stored for each target network node. The CME (e.g., CME 756) of any given network node may select a current RF transmit power level based on, for example, one or more of "cluster information," "historical information," and "measured values."

In accordance with various aspects of the present disclosure, "cluster information" may, for example, refer to whether the network node of the CME (e.g., CME 756) (i.e., the "source network node") and the target network node are in the same "cluster," where a "cluster" may, for example, be as discussed above with regard to the clusters 117, 118 of FIG. 8. For example, where the network node of the CME (i.e., the "source network node") and the target network node are part of the same cluster, the CME (e.g., CME 756) of the "source network node" may set its current RF transmit power level to an RF transmit power level currently being reported by one or more other network nodes of the cluster (e.g., to the lowest RF transmit power level among all of the RF transmit power levels reported by the network nodes of the cluster).

In accordance with various aspects of the present disclosure, "historical information" may include, for example, RF transmit power levels previously reported by other network nodes in similar contexts (e.g., reported by network nodes that previously passed through the same or a similar geographic location). For example, historical information about past contexts including RF transmit power levels that were used in those past contexts may be analyzed to determine which of the past contexts is most similar to the current context of a particular network node, and the RF transmit power level setting used for that most-similar past context may be selected as the current RF transmit power level for the particular network node. The historical information may, for example, be gathered by fixed APs, mobile APs, sensors, and/or end-user devices in a network according to various aspects of the present disclosure, and may then be conveyed to the Cloud for storage and/or analysis. Additionally, or alternatively, storage and/or analysis of the historical information may be distributed among fixed and/or mobile APs (e.g., taking advantage of the resources of APs which currently have excess resources). For example, the Cloud and/or various AP(s) may continuously or periodically advertise (e.g., broadcast or distribute) information to various network nodes that identifies the best RF transmission power level for those network nodes to use (e.g., for a particular period of time and/or a particular geographic region), instead of waiting for a network node to ask for such information.

In accordance with various aspects of the present disclosure, "measured values" used for selecting an RF transmit power level may comprise, for example, the current modulation/encoding scheme, and a distance between the transmitting network node (i.e., the "source network node") and the target network node.

In accordance with various aspects of the present disclosure, the cluster information, historical information, and measured values discussed above may be used in a hierarchical manner for selecting an RF transmit power level. For example, a CME (e.g., CME 756 of FIG. 7) may first attempt to rely on cluster information in performing selection, and may rely on historical information only if suitable cluster information is not available (e.g., the network node performing the selection of RF transmit power level is not currently part of a cluster, and may rely on measured values only if suitable historical information is not available (e.g., there is no historical information for a sufficiently similar context). Alternatively, the CME (e.g., CME 756) may, for example, use a combination of cluster information, historical information, and measured values. For example, the selected RF transmit power level may be a weighted average of a first RF transmit power level determined from cluster information, a second RF transmit power level determined from historical information, and a third RF transmit power level determined from measured values.

In accordance with various aspects of the present disclosure, RF transmit power level information supplied to a particular network node by the Cloud and/or from other network nodes in the cluster to which the particular network node belongs may be validated using the output of a propagation model of the CME of the particular network node. In such a situation, the propagation model may, for example, accept an indication of the received RF power and the channel load parameter as inputs. The output of the propagation model and the channel load parameter may be used as inputs to, by way of example and not limitation, an analytic hierarchy process function (AHP), a fuzzy-logic function, a weighted function, or other type of multi-objective optimization function, etc., where each input may, for example, be applied with a specific weight in an analytic hierarchy process (AHP) function. After setting the current RF transmit power level, the CME (e.g., CME 756) of the particular network node may begin probing the RF communication channel in order to determine whether the current RF transmit power level is best/optimal/adequate/or the like for the current context of the particular node, may also probe the RF communication channel for lower and higher RF transmit power levels stored in the CTPT. Using this approach, the CME avoids having to start at a maximum possible or minimum possible RF transmit power level and then test all possible RF transmit power levels, thus reducing the amount of time and the amount of power required for determination of the optimal RF transmission power.

In accordance with various aspects of the present disclosure, at least a minimum number of probes (NP) may be sent for each RF transmit power level, so the CME (e.g., CME 756) is able to evaluate the RF communication channel condition upon receipt of the transmission status. Note that the NP parameter may have a default value, but may be configurable through a request to a higher protocol layer (e.g., higher protocol layer functionality 758 of FIG. 7) based on, for example, local shared information (e.g., from other network nodes in the same cluster) and/or remote information received from the Cloud.

Figure 10:
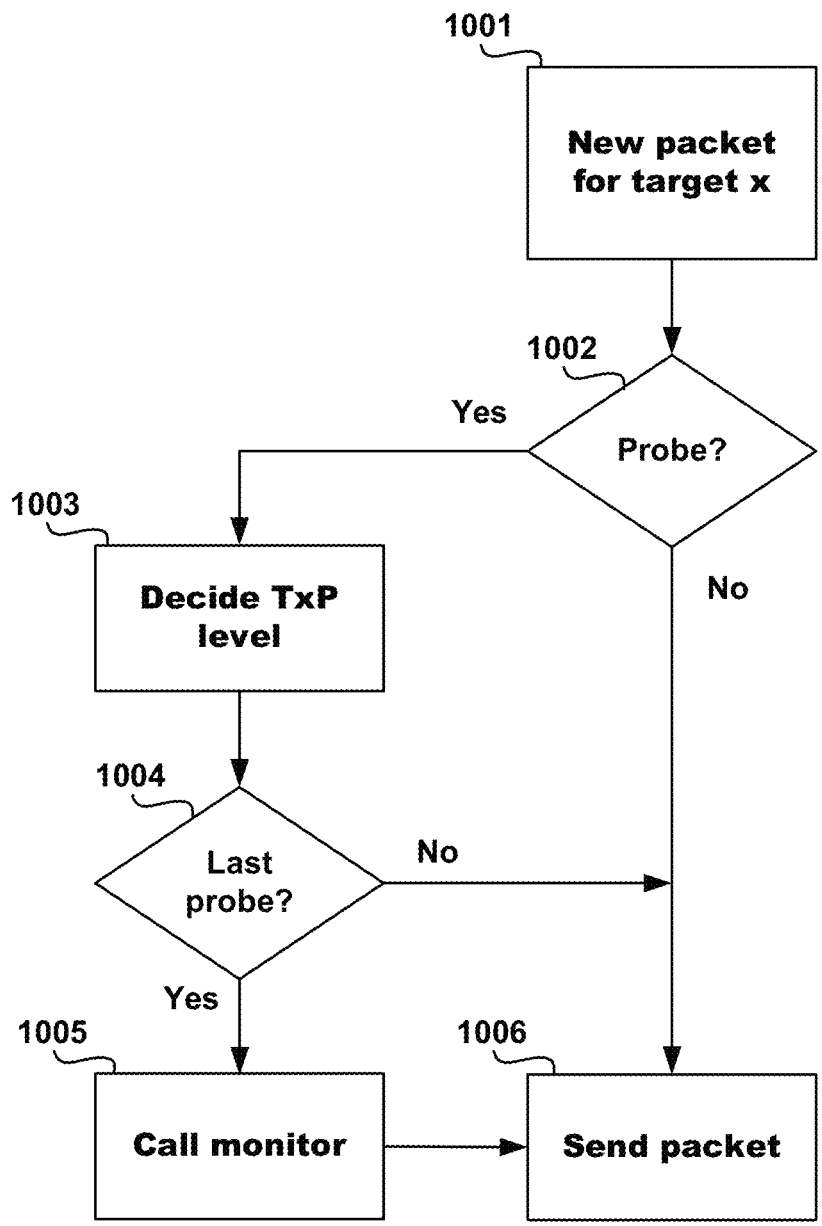
FIG. 10 is a flow chart illustrating an example process for sending "probe" packets for probing a target network node x, in accordance with various aspects of the present disclosure.

FIG. 10 is a flow chart illustrating an example process 1000 for sending "probe" packets for probing a target network node x, in accordance with various aspects of the present disclosure. The process of FIG. 10 may be performed by any of the network nodes illustrated in or discussed herein with regard to the networks, nodes, actions, or elements of FIGS. 1-9. The method of FIG. 10 begins at block 1001, where new information (e.g., a packet of information) to be transmitted by a source network node to a target network node x is received by the CME (e.g., CME 756 of FIG. 7) of the source network node. At block 1002, the CME of the source network node determines whether the packet for transmission should be selected as a "probe" packet. The CME may, for example, make this decision by checking whether a certain number (e.g., NP) of "probe" packets have already been sent for each of the RF transmission power levels in the CTPT entry for target network node x. If, at block 1002, the packet for transmission is not selected to be a "probe" packet, the process of FIG. 10 then advances to block 1006, and the packet is passed to lower protocol layers for transmission into the network.

If, however, at block 1002, the packet is selected to be a "probe" packet, then the process of FIG. 10 may advance to block 1003, at which the RF transmit power level (i.e., TxP) for the "probe" packet is selected. In accordance with various aspects of the present disclosure, the RF transmit power level for this "probe" packet may be determined based on how many "probe" packets have already been sent to target network node x during this "Probing" phase, based on NP, and based on the number of transmit power levels stored in the CTPT for each target network node. For example, in the discussion above, three RF transmit power levels referred to as a "current RF transmit power level," a "higher RF transmit power level," and a "lower RF transmit power level" were described. A greater or lesser number of RF transmit power levels may be used. After completion of block 1003, the example process of FIG. 10 advances to block 1004.

At block 1004, a determination is made whether the present packet is the last "probe" packet for this "Probing" phase. In accordance with various aspects of the present disclosure, the last probe may be, for example, the $(3 \times NP)^{th}$ phase. For example, the first NP "probe" packets for target network node x may be sent using the "current RF transmit power level" in the CTPT entry for target network node x, the next NP "probe" packets may be sent using the "lower transmit power level" in the CPTP entry for target network node x, and the third NP "probe" packets may be sent using the "higher RF transmit power level" in the CPTP entry for target network node x. If the current "probe" packet is not the last "probe" packet for this "Probing" phase, then the process of FIG. 10 advances to block 1006, and the "probe" packet is passed to a lower protocol layer for wireless transmission into the network. In accordance with aspects of the present disclosure, the transmitted packet may be added to a queue/list of packets that have been successfully sent as "probe" packets to the lower layer of the protocol (e.g., a layer responsible for controlling the hardware (H/W) used to wirelessly transmit the packets), each transmitted "probe" packet is associated in the queue/list with the transmit power (TxP) selected for transmission of the associated "probe" packet. The CME may then wait for the lower protocol layer (e.g., the H/W) to send information about the transmission status of the packet. Such transmission status information may be sent to the CME upon receipt of an acknowledgement (Ack) from the target network node, and may be matched against the entries in the queue of packets sent as "probe" packets. The transmission status information may include, for example, the RF signal power of the received acknowledgement, and the time it took for the H/W to send the transmitted packet, including any retries. The transmit status information is used by the CME at a later stage of the process. In accordance with aspects of the present disclosure, the target node need not know that the sending node has sent a "probe" packet.

If, however, at block 1004, the current "probe" packet is the last "probe" packet to be sent, then the process of FIG. 10 advances to block 1005, where a "monitor process" is called or activated. The monitor process waits (e.g., sleeps) for a notification that a "probe" packet has been received. The processing associated with receipt by a network node of a "probe" packet is described below with respect to FIG. 11.

Figure 11:
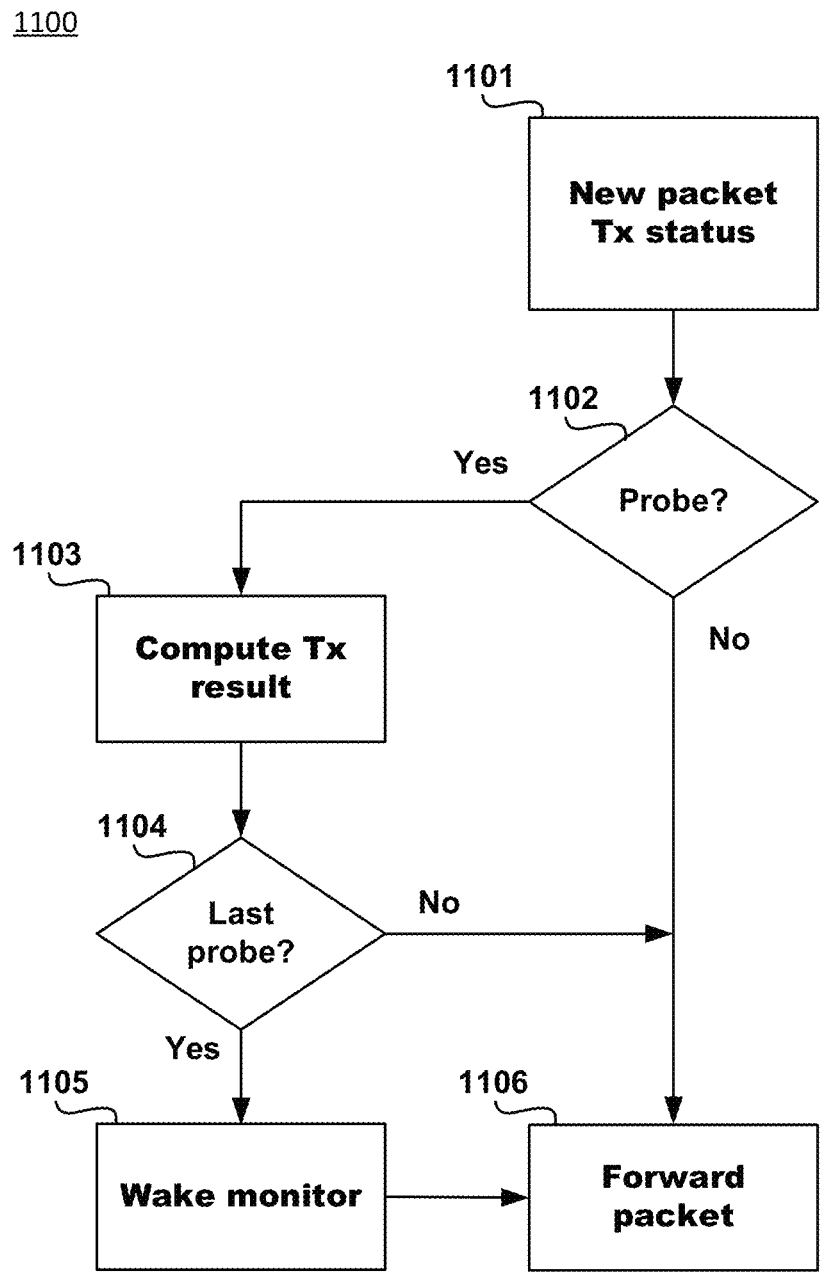
FIG. 11 is a flow chart illustrating an example process for receiving "probe" packets for probing of a target network node x, in accordance with various aspects of the present disclosure.

FIG. 11 is a flow chart illustrating an example process 1100 for receiving "probe" packets for probing of a target network node x, in accordance with various aspects of the present disclosure. The process of FIG. 11 may be performed by any of the network nodes illustrated in or discussed herein with regard to the networks, nodes, actions, or elements of FIGS. 1-9. The method of FIG. 11 begins at block 1101, where the PHY (e.g., MAC/PHY protocol layer functionality 754) of a particular network node indicates successful receipt of a packet. Next, at block 1102, the CME of the particular network (e.g., CME 756) determines whether the received packet is a "probe" packet (i.e., completion of a round trip of a "probe" packet sent by the example process of FIG. 10). If the received packet is not a "probe" packet, the process of FIG. 11 then advances to block 1106, and the received packet is handed off to the higher protocol layers (e.g., higher protocol layer functionality 758 of FIG. 7).

If, however, at 1102, the received packet is determined to be a "probe" packet, then the process of FIG. 11 advances to block 1103, at which the CME of the receiving network node updates the CTPT to indicate successful receipt of this particular "probe" packet. For example, NP×3 probes, indexed from 1 to NP×3, may have been sent to target network node x, and this received packet may be the "probe" packet with index NP-1, so the CTPT is updated to indicate successful receipt of "probe" packet NP-1 for target network node x. After completing the actions of block 1103, the process of FIG. 11 advances to block 1104.

At block 1104, a determination is made whether the received "probe" packet is the last "probe" packet for target network node x. If that is not the case, then the process advances to block 1106, and the received packet is handed off to the higher protocol layers (e.g., higher protocol layer functionality 758 of FIG. 7).

If, however, at block 1104, it is determined that the received "probe" packet is the last "probe" packet for target network node x, then control passed to block 1106, where a "monitor process" is awakened/notified and the "probe" packet is handed off to the higher protocol layers (e.g., higher protocol layer functionality 758 of FIG. 7). In response to being awakened/notified, the monitor process then performs the actions of the process described below with respect to FIG. 12.

In accordance with various aspects of the present disclosure, the monitor process may "timeout," for example, if all "probe" packets have not been received within a predetermined timeout period that may, for example, be remotely or user configurable and/or may adapt based on context of the network node.

Figure 12:
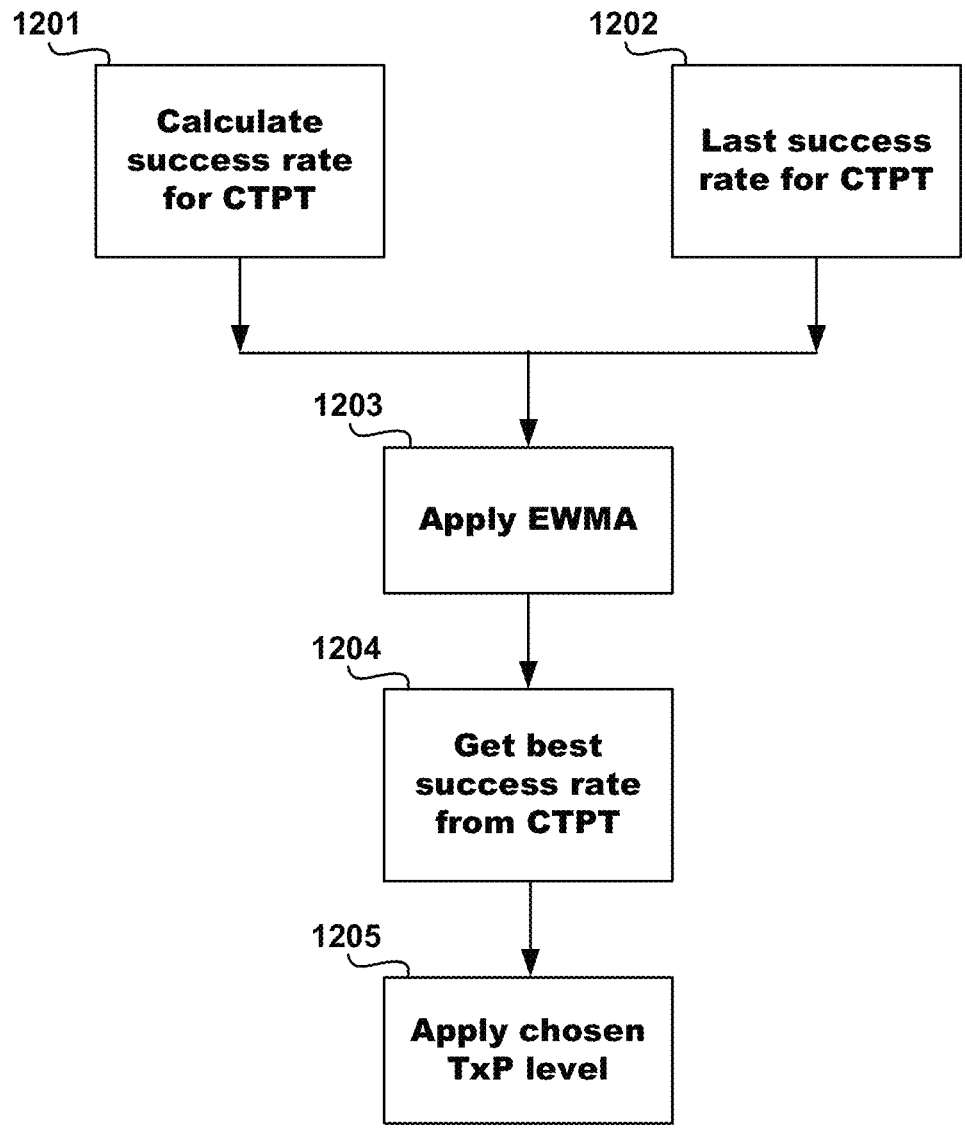
FIG. 12 is a flow chart illustrating an example monitor process that may correspond to, for example, the monitor processes referred to in, and discussed with regard to FIG. 10 and FIG. 11, in accordance with various aspects of the present disclosure.

FIG. 12 is a flow chart illustrating an example monitor process 1200 that may correspond to, for example, the monitor processes referred to in, and discussed with regard to FIG. 10 and FIG. 11, in accordance with various aspects of the present disclosure. The process of FIG. 12 may be performed by any of the network nodes illustrated in or discussed herein with regard to the networks, nodes, actions, or elements of FIGS. 1-11. The process of FIG. 12 begins at block 1201, after the monitor process of FIG. 12 has been awakened/activated as discussed above (e.g., at block 1105 of FIG. 11). In accordance with various aspects of the present disclosure, there may be an individual monitor process actively evaluating communication with each target node, so one or more instances of the monitor process 1200 may exist at any point in time. In accordance with various aspects of the present disclosure, the monitor process (e.g., performed by the CME (e.g., CME 756) of a network node)

may calculate a new "success rate" for each of the RF transmit power levels within the CTPT entries for each listed target network node. That is, for each RF transmit power level used by an implementation according to aspects of the present disclosure, the monitor process of FIG. 12 of a network node may, for example, calculate the percentage of the NP "probe" packets that were successfully received by each target network node listed in its CTPT. At block 1202, the old success rate for the target network node (e.g., calculated from the results of one or more "Probing" phases) is retrieved from the CTPT. Next, at block 1203, the new success rate and old success rate for each probed RF transmit power level for each listed target network node are processed to choose the better of the two or to generate a composite success rate that is a result of a combination of the two. Using some combination of the old success rates and the new success rates may smooth out changes to, for example, repeated oscillations (e.g., "ping-pong effect") between two RF transmit power levels. In the example process shown in FIG. 12, a composite success rate is calculated using the Exponential Weighted Moving Average (EWMA) of the new and old success rates. In accordance with various aspects of the present disclosure, different techniques may be used to smooth out changes in the RF transmit power level and avoid oscillations. After completing block 1203, the process of FIG. 12 advances to block 1204. It should be noted that other methods may be used to derive the success rate such as, for example, techniques using "fuzzy logic," an analytical hierarchical process (AHP), a weighted function, and/or a multipurpose function, to name just a few. The weights/parameters of such functions may be tuned/set after performing experiments in different operating environments and networks.

At block 1204, the CME of the network node may select the best of the RF transmit power levels (e.g., in the example discussed herein, "current RF transmit level," "lower RF transmit level," and "higher RF transmit level") for each target network node listed in the CTPT, based on the success rates calculated in block 1203. Then, at block 1205, the RF transmit power level selected at block 1204 is set as the new "current RF transmit power level" in the CTPT entry for the target network node and, according to the present example, the "lower RF transmit power level" and "higher RF transmit power level" in the CTPT entry for the target network node are updated accordingly. Selection of the "lower RF transmit power level" and the "higher RF transmit power level" may be updated using a table or function, subject to any restrictions upon the maximum allowable transmit power level allowed by an appropriate governing entity. For example, the "lower RF transmit power level" and the "higher RF transmit power level" may simply be the next lower and next higher RF transmit power levels from the "current RF transmit power level," respectively, of which the transmitter H/W is capable. Finally the CME of the network node sets the target network node status to "Waiting," and all future packets are sent to that target network node using the "current RF transmit power level," TxP.

In accordance with various aspects of the present disclosure, the CME may set the status of the target network node to "Updating" after the passing of a certain period of time, if any new input has been passed to the target network node, or may set the status of the target network node to "Probing," which restarts the RF communication channel evaluation process.

In accordance with some aspects of the present disclosure, the selection of the best/optimal RF transmit power level may be based on other factors in addition to, or instead of, the probe success rate. For example, the highest probe success rate may not necessarily correspond to highest network throughput. This may be due to the effects of a higher-order modulation and/or a higher forward error correction (FEC) code rate, which may compensate for a higher number of lost packets. Thus, an RF transmit power level predicted to achieve highest throughput, but not best probe success rate, may be selected.

In accordance with some aspects of the present disclosure, the adaptation of the RF transmit power level may be limited by maximum and/or minimum thresholds that may be manually set (e.g., by default) and/or that may be dynamically adapted/updated based on information from other network nodes and/or the Cloud.

CATPA methods and systems such as those described herein provide for dynamic adaptation of RF transmit power in a manner well suited for a vehicular mesh network. By sharing RF transmit power level decisions, as well as other information, among network nodes of a cluster and/or with the Cloud, CATPA methods and systems such as those described herein can improve RF communication channel conditions, reduce network node power consumption as compared to always using the maximum permitted RF transmit power level, reduce power consumption as compared to having to step through many possible RF transmit power levels, and improve the quality of service in each location by reducing the probability of packet collisions.

In accordance with various aspects of the present disclosure, different entities managing the network can present specific needs that may affect the way in which the network works and also the performance of the CATPA methods and systems, such as the examples described herein. On a very adaptable network, such as a city-wide deployment, use of the CATPA methods and systems in many (or all) network nodes permits adaptation for better network throughput and wireless communication range. This enables, for example, restraining the maximum (e.g., to keep collision of transmitted information below a desired level) and/or minimum (e.g., to ensure full connectivity among all network nodes of a cluster) RF transmission power used in certain geographic locations, where desired. The mobile APs, fixed APs, Cloud, and/or sensors of a network of moving things in accordance with aspects of the present disclosure may expose an application programming interface (API) that enables clients to interact directly with the nodes of the network to permit control of the CATPA methods and systems (e.g., to override the adaptation process in some nodes, set different thresholds in some nodes, etc.).

Various aspects of the present disclosure may be found in a method of operating a first node of a network comprising a plurality of nodes. Such a method may comprise, in the first node, receiving a packet for transmission to a second node of the plurality of nodes; and determining whether to transmit the received packet as a packet of a first type or as a packet of a second type, based on the existence of at least one condition at the first node. The method may further comprise wirelessly transmitting the received packet to the second node as a packet of the first type using a first radio frequency (RF) transmit power level and incrementing a count of packets of the first type transmitted to the second node, if the at least one condition exists; and wirelessly transmitting the received packet to the second node as a packet of the second type using a second RF transmit power level, if the at least one condition does not exist. The at least one condition may comprise the count of packets of the first type transmitted to the second node, during a certain interval of time, being less than or equal to a certain number, and the certain interval of time may occur periodically during operation of the first node. Wirelessly transmitting the received packet to the second node as a packet of the first type may comprise selecting the first RF transmit power level from a plurality of adjustable RF transmit power levels at the first node and corresponding to the second node.

Such a method may further comprise determining values of the plurality of RF transmit power levels based on the count of packets of the first type transmitted to the second node and a count of responses received by the first node to packets of the first type sent by the first node; and resetting the count of packets of the first type transmitted to the second node. Selecting the first RF transmit power level may be based upon the count of packets of the first type transmitted by the first node during the certain interval of time and a defined maximum number of packets of the first type to be transmitted to the second node during the certain interval of time.

Such a method may also comprise determining a current geographic location of the first node; and setting values of one or more RF transmit power levels of the plurality of RF transmit power levels, using the current geographic location of the first node. The method may further comprise wirelessly broadcasting, via the network, values of one or more RF transmit power levels of the plurality of RF transmit power levels. Values of the plurality of RF transmit power levels may be received by the first node via the network from a cloud-based system remote from the first node. One node of the first node and the second node may be located in a vehicle movable throughout a geographic area served by the network and the other node of the first node and the second node may be located at a fixed geographic location in the geographic area served by the network.

Additional aspects of the present disclosure may be seen in a non-transitory computer-readable medium comprising a plurality of code sections. Each code section may comprise a plurality of instructions executable by one or more processors, and the instructions may cause the one or more processor to perform the steps of a method of operating a first node of a network comprising a plurality of nodes, where the steps of the method are as described above.

Yet further aspects of the present disclosure may be observed in a system for use in a first node of a network comprising a plurality of nodes. Such a system may comprise one or more processors operably coupled to storage comprising a non-transitory computer-readable medium and to a radio frequency (RF) transmitter and receiver. The one or more processors may be operable to, at least, execute instructions that perform the steps of a method such as that described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes.

As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a first node of a wireless network comprising a plurality of nodes, the method comprising:
in the first node,
receiving a packet for transmission to a second node of the plurality of nodes;
determining a RF transmit power level for use in transmitting the packet, wherein the RF transmit power level is determined is based on:
one or both of:
at least one adjustable RF transmit power level corresponding to the second node that is maintained at the first node; and
RF transmit power level information obtained from one or more other nodes of the plurality of nodes; and
historical RF transmit power level information reported by a node of the plurality of nodes when the node was operating in a geographic location determined to be most similar to a current geographic location of the first node; and
wirelessly transmitting the received packet to the second node using the RF transmit power level.

2. The method according to claim 1, comprising maintaining, for a certain period of time, at least one adjustable radio frequency (RF) transmit power level corresponding to each node of a collection of nodes of the plurality of nodes.

3. The method according to claim 2, comprising determining the nodes of the collection based on identification as potential target nodes of wireless communication from the first node.

4. The method according to claim 1, wherein the at least one adjustable RF transmit power level comprises three adjustable RF transmit power levels.

5. The method according to claim 1, comprising determining the RF transmit power level based on current RF transmit power level information reported by at least one of the one or more other nodes of the plurality of nodes within wireless communication range of the first node.

6. The method according to claim 1, wherein the determination of similarity is performed by a cloud-based system using historical RF transmit power levels reported to the cloud-based system by nodes of the plurality of nodes.

7. A non-transitory computer-readable medium on which is stored a plurality of code sections, each code section comprising a plurality of instructions executable by one or more processors, the instructions causing the one or more processors to perform the steps of a method of operating a first node of a wireless network comprising a plurality of nodes, the steps of the method comprising:
in the first node,
receiving a packet for transmission to a second node of the plurality of nodes;
determining a RF transmit power level for use in transmitting the packet, wherein the RF transmit power level is determined is based on:
one or both of:
at least one adjustable RF transmit power level corresponding to the second node that is maintained at the first node; and
RF transmit power level information obtained from one or more other nodes of the plurality of nodes; and
historical RF transmit power level information reported by a node of the plurality of nodes when the node was operating in a geographic location determined to be most similar to a current geographic location of the first node; and
wirelessly transmitting the received packet to the second node using the RF transmit power level.

8. The non-transitory computer-readable medium according to claim 7, the steps of the method further comprising maintaining, for a certain period of time, at least one adjustable radio frequency (RF) transmit power level corresponding to each node of a collection of nodes of the plurality of nodes.

9. The non-transitory computer-readable medium according to claim 8, the steps of the method further comprising determining the nodes of the collection based on identification as potential target nodes of wireless communication from the first node.

10. The non-transitory computer-readable medium according to claim 7, wherein the at least one adjustable RF transmit power level comprises three adjustable RF transmit power levels.

11. The non-transitory computer-readable medium according to claim 7, the steps of the method further comprising determining the RF transmit power level based on current RF transmit power level information reported by at least one of the one or more other nodes of the plurality of nodes within wireless communication range of the first node.

12. The non-transitory computer-readable medium according to claim 7, wherein the determination of similarity is performed by a cloud-based system using historical RF transmit power levels reported to the cloud-based system by nodes of the plurality of nodes.

13. A system for use in a first node of a wireless network comprising a plurality of nodes, the system comprising:
one or more processors operably coupled to storage comprising a non-transitory computer-readable medium and to a radio frequency (RF) transmitter and receiver, the one or more processors being operable to, at least:
receive a packet for transmission to a second node of the plurality of nodes;
determine a RF transmit power level for use in transmitting the packet, wherein the RF transmit power level is determined is based on:
one or both of:
at least one adjustable RF transmit power level corresponding to the second node that is maintained at the first node; and
RF transmit power level information obtained from one or more other nodes of the plurality of nodes; and historical RF transmit power level information reported by a node of the plurality of nodes when the node was operating in a geographic location determined to be most similar to a current geographic location of the first node; and wirelessly transmit the received packet to the second node using the RF transmit power level.

14. The system according to claim 13, wherein the one or more processors are operable to maintain, for a certain period of time, at least one adjustable radio frequency (RF) transmit power level corresponding to each node of a collection of nodes of the plurality of nodes.

15. The system according to claim 14, wherein the nodes of the collection have been identified as target nodes of wireless communication from the first node.

16. The system according to claim 13, wherein the at least one adjustable RF transmit power level comprises three adjustable RF transmit power levels.

17. The system according to claim 13, wherein respective geographic coordinates are wirelessly shared with nodes of the wireless network by the one or more other nodes.

18. The system according to claim 13, wherein the one or more processors are operable to determine the RF transmit power level based on current RF transmit power level information reported by at least one of the one or more other nodes of the plurality of nodes within wireless communication range of the first node.

19. The system according to claim 13, wherein the determination of similarity is performed by a cloud-based system using historical RF transmit power levels reported to the cloud-based system by nodes of the plurality of nodes.

* * * * *